United States Patent
Yu

(10) Patent No.: US 11,215,996 B2
(45) Date of Patent: Jan. 4, 2022

(54) METHOD AND DEVICE FOR CONTROLLING VEHICLE, DEVICE, AND STORAGE MEDIUM

(71) Applicant: BAIDU ONLINE NETWORK TECHNOLOGY (BEIJING) CO., LTD., Beijing (CN)

(72) Inventor: Hao Yu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 68 days.

(21) Appl. No.: 16/729,328

(22) Filed: Dec. 28, 2019

(65) Prior Publication Data

US 2020/0209866 A1 Jul. 2, 2020

(30) Foreign Application Priority Data

Dec. 29, 2018 (CN) .......................... 201811638546.4

(51) Int. Cl.
  *G05D 1/02* (2020.01)
  *B60W 60/00* (2020.01)
  (Continued)

(52) U.S. Cl.
  CPC .......... *G05D 1/0212* (2013.01); *B60W 40/02* (2013.01); *B60W 60/00259* (2020.02); *B60W 2050/0005* (2013.01); *B60W 2420/42* (2013.01)

(58) Field of Classification Search
  CPC .......... G05D 1/0212; B60W 60/00259; B60W 40/02; B60W 2050/0005; B60W 2420/42
  See application file for complete search history.

(56) References Cited

U.S. PATENT DOCUMENTS

| 8,903,160 B2 * | 12/2014 | Jeong | ................. G06K 9/00664 |
| | | | 382/153 |
| 9,170,581 B2 * | 10/2015 | Bell | .......................... G06T 3/00 |

(Continued)

FOREIGN PATENT DOCUMENTS

| CN | 107169468 A | 9/2017 |
| CN | 107678306 A | 2/2018 |

(Continued)

OTHER PUBLICATIONS

Wen Chen at al., Monocular Semantic SLAM in Dynamic Street Scene Based on Multiple Object Tracking, 2017 IEEE 8th Intl Conference on CIS & RAM, Ningbo, China, pp. 599-604.

(Continued)

*Primary Examiner* — Yazan A Soofi
*Assistant Examiner* — Naeem Taslim Alam
(74) *Attorney, Agent, or Firm* — Lathrop GPM LLP

(57) ABSTRACT

The present disclosure provides a method and a device for controlling a vehicle, a device and a storage medium, and relates to the field of unmanned vehicle technologies. The method includes: acquiring a vehicle environment image by an image acquirer during traveling of the vehicle; extracting a static environment image included in the vehicle environment image; obtaining a planned vehicle traveling trajectory by taking the static environment image as an input of a trajectory planning model; and controlling the vehicle to travel according to the planned vehicle traveling trajectory.

12 Claims, 3 Drawing Sheets

(51) Int. Cl.
*B60W 40/02* (2006.01)
*B60W 50/00* (2006.01)

(56) References Cited

U.S. PATENT DOCUMENTS

| | | | |
|---|---|---|---|
| 9,940,729 B1 | 4/2018 | Kwant et al. | |
| 2016/0033965 A1* | 2/2016 | Kopetz | B60W 10/18 701/23 |
| 2018/0101178 A1* | 4/2018 | Yoon | G05D 1/0253 |
| 2018/0254916 A1* | 9/2018 | Kaag | H04L 12/281 |
| 2018/0336421 A1* | 11/2018 | Huang | G06K 9/00791 |
| 2019/0025071 A1* | 1/2019 | Fukui | G09B 29/10 |
| 2019/0138007 A1* | 5/2019 | Baghsorkhi | G08G 1/091 |
| 2019/0286915 A1* | 9/2019 | Patil | G06T 7/73 |
| 2019/0384303 A1* | 12/2019 | Muller | G06K 9/00791 |
| 2019/0384304 A1* | 12/2019 | Towal | G05D 1/0221 |
| 2020/0125862 A1* | 4/2020 | Lee | G06K 9/627 |
| 2020/0166940 A1* | 5/2020 | Sarkar | G05D 1/0214 |
| 2020/0180647 A1* | 6/2020 | Anthony | G08G 1/0145 |
| 2020/0184231 A1* | 6/2020 | Viswanathan | G06K 9/6267 |
| 2020/0189597 A1* | 6/2020 | Veronese | G06K 9/00798 |

FOREIGN PATENT DOCUMENTS

| | | |
|---|---|---|
| CN | 108139756 A | 6/2018 |
| GB | 2520612 A | 5/2015 |
| WO | WO 2014114923 A1 | 7/2014 |
| WO | WO 2015009217 A1 | 1/2015 |

OTHER PUBLICATIONS

Chinese Patent Application No. 201811638546.4 Office Action dated Feb. 3, 2020, 7 pages.
Chinese Patent Application No. 201811638546.4 English translation of Office Action dated Feb. 3, 2020, 9 pages.
European Patent Application No. 19219836.4, extended Search and Opinion dated Apr. 21, 2020, 9 pages.

* cited by examiner

METHOD AND DEVICE FOR CONTROLLING VEHICLE, DEVICE, AND STORAGE MEDIUM

CROSS-REFERENCE TO RELATED APPLICATIONS

This application claims priority to and benefit of Chinese Patent Application No. 201811638546.4, filed with the National Intellectual Property Administration of P. R. China on Dec. 29, 2018, the entire contents of which are incorporated herein by reference.

TECHNICAL FIELD

The present disclosure relates to the field of unmanned vehicle technologies, and more particularly, to a method and a device for controlling a vehicle, a device, and a storage medium.

BACKGROUND

Traditional manual driving relies on the driver who makes all the driving operations. By contrast, an unmanned (or autonomous) driving system assists the user (or driver) in driving the vehicle by performing part or all of the user's driving operation.

SUMMARY

Embodiments of the present disclosure provide a method for controlling a vehicle. The method includes: acquiring a vehicle environment image of the vehicle by an image acquirer during traveling of the vehicle; extracting a static environment image included in the vehicle environment image; obtaining a planned vehicle traveling trajectory by taking the static environment image as an input of a trajectory planning model; and controlling the vehicle to travel according to the planned vehicle traveling trajectory.

Embodiments of the present disclosure provide a device. The device includes one or more processors; and a storage device configured to store one or more programs. When the one or more programs are executed by the one or more processors, the one or more processors are caused to implement the method for controlling a vehicle according to any embodiment of the present disclosure.

Embodiments of the present disclosure provide a computer readable storage medium having stored thereon a computer program that, when executed by a processor, causes the method for controlling a vehicle according to any embodiment of the present disclosure to be implemented.

BRIEF DESCRIPTION OF THE DRAWINGS

In order to illustrate technical solutions of embodiments of the present disclosure, a brief description of drawings used in embodiments is provided below. The drawings in the following descriptions represent only some but not all embodiments of the present disclosure. One skilled in the art may be able to obtain other drawings according to these drawings without a creative process.

DETAILED DESCRIPTION

The present disclosure will be described in detail below with reference to the accompanying drawings and the embodiments. It should be understood that, the specific embodiments described herein are only used to illustrate the present disclosure rather than to limit the present disclosure. In addition, it should also be noted that, for convenience of description, only some but not all structures related to the present disclosure are illustrated in the accompanying drawings.

In the field of unmanned vehicle technologies, the trajectory of the vehicle is mainly determined in the following manners. The vehicle environment data is acquired by a sensing module, and is transmitted to a decision planning module, vehicle environment information is determined by the decision planning module by semantically recognizing the vehicle environment data, and the trajectory of the vehicle is determined based on the vehicle environment information and vehicle location information obtained by a positioning module. However, the above manner for determining the trajectory relies on a large amount of data and is inefficient.

Embodiment 1

Figure 1:
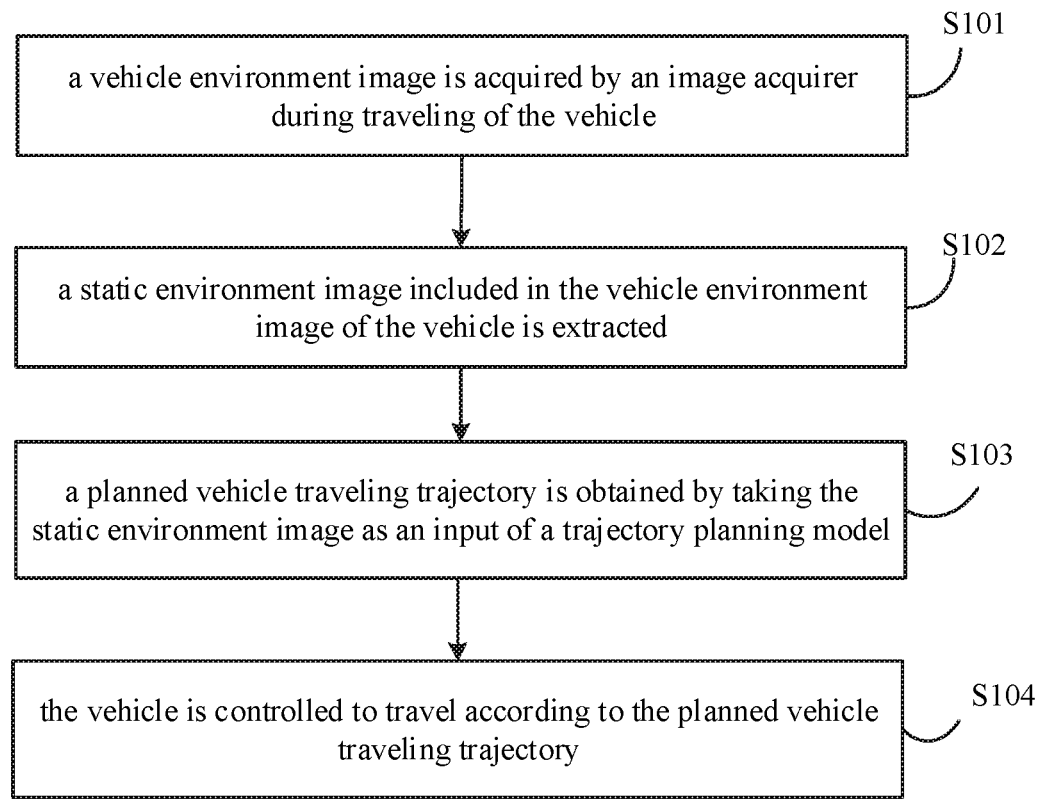
FIG. 1 is a flow chart of a method for controlling a vehicle according to Embodiment 1 of the present disclosure.

FIG. 1 is a flow chart of a method for controlling a vehicle according to Embodiment 1 of the present disclosure. This embodiment may be applicable to the cases of determining the traveling trajectory of the vehicle in an unmanned driving mode. The method may be performed by a device for controlling a vehicle according embodiments of the present disclosure, and the method may include the following.

At block S101, a vehicle environment image is acquired by an image acquirer during traveling of the vehicle.

In an embodiment, the vehicle environment image may denote the image of the environment around the vehicle, i.e., the environment image of the vehicle. At least one image acquirer may be disposed on the periphery of the vehicle, for example, the front, the rear and both sides of the vehicle may be provided with at least one image acquirer. During the traveling of the vehicle, the image acquirer disposed on the vehicle may acquire the vehicle environment image. In the traveling environment of the vehicle, there may be static objects such as the traffic light, the road sign, the road surface, the tree, or the building, and there may also be dynamic objects such as the pedestrian, the moving vehicle, or the animal. Accordingly, the vehicle environment image may include the static environment image and the dynamic environment image.

At block S102, a static environment image included in the vehicle environment image of the vehicle is extracted.

The static object in the vehicle environment image may be recognized based on image recognition technology. Optionally, the vehicle environment image may be taken as an input of a static image extraction model to obtain the static environment image included in the vehicle environment image. The static image extraction model may be obtained by acts of: acquiring sample vehicle environment images, obtaining static area annotations and dynamic area annotations in the sample vehicle environment images, and training and obtaining the neural network model based on the sample vehicle environment images, the static area annotations and dynamic area annotations in the sample vehicle environment images. The structure of the neural network model is not limited in the embodiment, for example, the neural network model may be a convolutional neural network (CNN).

By comparing with historical static environment images, candidate static environment images may be obtained, and a credibility value of each of the candidate static environment images may be calculated according to the historical vehicle traveling trajectories, and when the credibility value of a candidate static environment image is greater than a preset threshold, the candidate static environment image may be determined as the static environment image, and the static environment image can be obtained.

At block S103, a planned vehicle traveling trajectory is obtained by taking the static environment image as an input of a trajectory planning model.

The trajectory planning model may be trained based on a neural network model. In an example, the trajectory planning model may be obtained by training historical static environment images and historical vehicle traveling trajectories based on a neural network model.

In an embodiment, historical static environment images acquired during historical traveling of the vehicle and historical vehicle traveling trajectories may be acquired, and an association between the historical static environment image acquired earlier and the historical vehicle traveling trajectory acquired later may be determined. For example, an association between the historical static environment image acquired at a first time point and the historical vehicle traveling trajectory acquired at a second time point may be determined, the second time point is later than the first time point, and the time difference between the second time point and the first time point is less than a time difference threshold. Moreover, the neural network model may be trained by taking the historical static environment image as the input of the neural network model, and taking the historical vehicle traveling trajectory associated with the historical static environment image as the output of the neural network model, and the trajectory planning model can be obtained. It should be noted that, in the embodiment, the structure of the neural network model is not limited, for example, the neural network model may be a recurrent neural network, a CNN, or a long short-term memory artificial neural network.

In the embodiment of the present disclosure, the traveling trajectory of the vehicle is determined according to the static environment image, the features of the dynamic object in the vehicle environment are not learned by the neural network, such that over-fitting can be avoided, and the accuracy of determining the vehicle travelling trajectory can be improved.

At block S104, the vehicle is controlled to travel according to the planned vehicle traveling trajectory.

In an embodiment, a control command may be generated according to the vehicle traveling trajectory, the control command is configured to instruct a control module in the vehicle to control the vehicle to travel according to the vehicle traveling trajectory. In the embodiment, the vehicle traveling trajectory is planned according to the static environment image acquired during the traveling of the vehicle, and the control module in the vehicle is controlled to follow the planned vehicle trajectory. Compared with the method for trajectory determination of the unmanned vehicle in the related art, which relies on a sensing module to acquire vehicle environment information and transmit the vehicle environment information to a decision planning module, and relies on the decision planning module to perform traveling parameter and/or state planning according to the vehicle environment information, embodiments of the present disclosure can improve the processing efficiency, and reduce the amount of data required for end-to-end autonomous driving.

With the technical solution according to embodiments of the present disclosure, the static environment image included in the vehicle environment image is extracted, and the traveling trajectory of the vehicle is planned according to the static environment image, such that over-fitting caused duo to the dynamic object may be avoided, and the amount of data required is reduced, thereby improving the processing efficiency.

Embodiment 2

Figure 2:
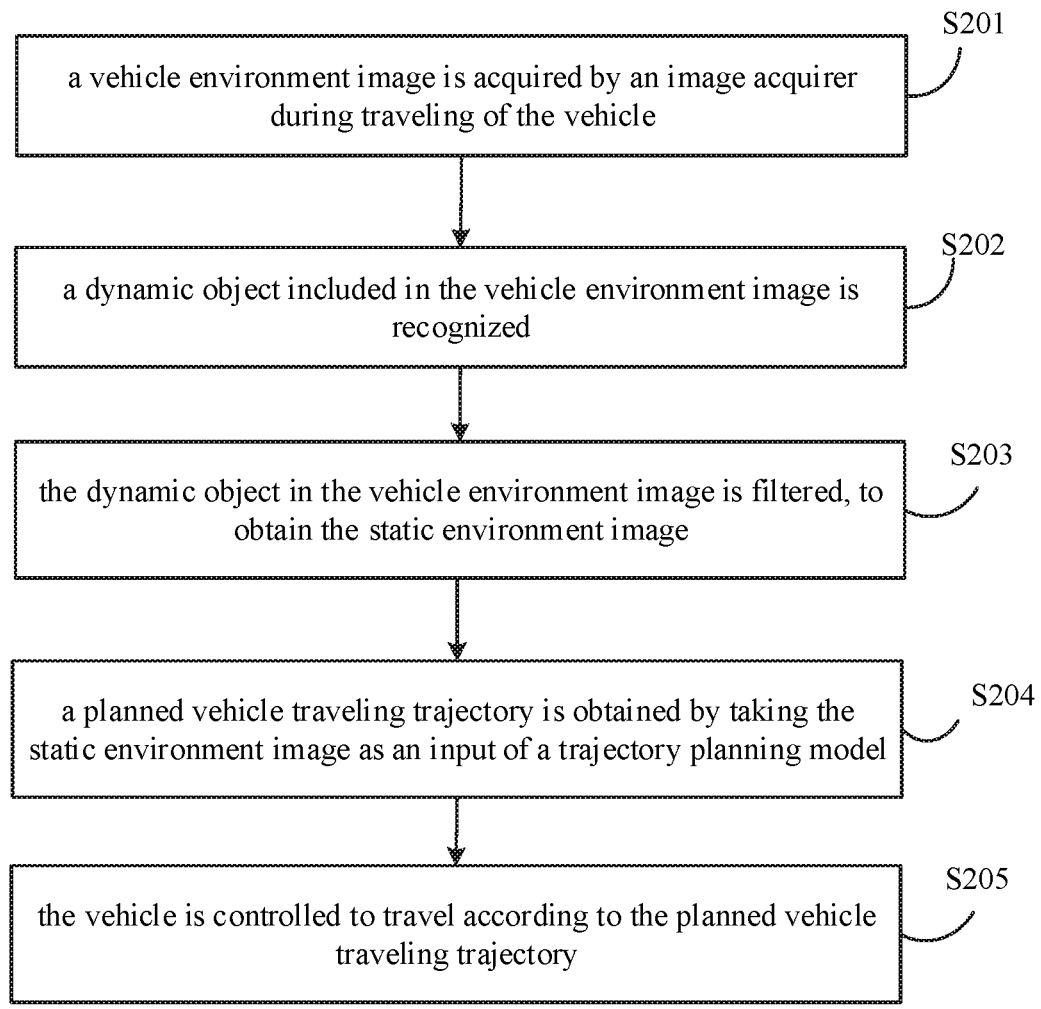
FIG. 2 is a flow chart of a method for controlling a vehicle according to Embodiment 2 of the present disclosure.

FIG. 2 is a flow chart of a method for controlling a vehicle according to Embodiment 2 of the present disclosure. The embodiment is on the basis of the above embodiment. As illustrated in FIG. 2, the method may include the following.

At block S201, a vehicle environment image is acquired by an image acquirer during traveling of the vehicle.

At block S202, a dynamic object included in the vehicle environment image is recognized.

The dynamic object may include the moving vehicle, the pedestrian, and the animal, etc. For example, the vehicle environment image may be compared with historical dynamic objects in the pre-established neural network model according to features, and an object in the vehicle environment image with a credibility value greater than a credibility threshold may be determined as the dynamic object, the dynamic object included in the vehicle environment image is recognized.

At block S203, the dynamic object in the vehicle environment image is filtered, to obtain the static environment image.

Based on pixel segmentation technology, the dynamic object in the vehicle environment image may be subject to pixel segmentation, and the segmented vehicle environment image may be determined as the static environment image.

In at least one embodiment, extracting the static environment image included in the vehicle environment image may include acts of: determining a traveling environment of the vehicle according to the vehicle environment image; when the traveling environment is an outdoor traveling environment, extracting a road surface image in the vehicle environment image; and when the traveling environment is an indoor traveling environment, extracting the road surface image and a ceiling image in the vehicle environment image.

In an example, feature comparison may be performed on the vehicle environment image and historical vehicle environment images based on features such as image intensity, edge shape, and image color, and the current traveling environment can be determined according to the credibility value. Alternatively, the current traveling environment may be determined by performing semantic recognition on speech signals received, for example, by a vehicle-mounted microphone.

When the vehicle is traveling outdoors, the road surface image in the vehicle environment image may be extracted, and the road surface image may be taken as the static environment image. By extracting the road surface image as the static environment image when the vehicle is traveling outdoors, the processing time for the system processing the image data can be reduced, and the efficiency of acquisition of the vehicle traveling trajectory can be improved.

When the traveling environment of the vehicle is an indoor traveling environment, the road surface image and the ceiling image in the vehicle environment image may be extracted. When the vehicle is traveling indoors, the road surface image and the image of the ceiling in the vehicle environment image may be extracted as the static environment image. By extracting the road surface image and the ceiling image as the static environment image when the vehicle is traveling indoors, the processing time for the system processing the image data can be reduced, and the efficiency of determination of the vehicle traveling trajectory can be improved.

At block S204, a planned vehicle traveling trajectory is obtained by taking the static environment image as an input of a trajectory planning model.

At block S205, the vehicle is controlled to travel according to the planned vehicle traveling trajectory.

With the technical solution of the embodiment of the present disclosure, the traveling environment such as the indoor traveling environment and the outdoor traveling environment of the vehicle is determined based on vehicle environment image, for the outdoor traveling environment, the road surface image in the vehicle environment image is extracted, and for the indoor traveling environment, the road surface image and the ceiling image in the vehicle environment image are extracted, such that the processing time for the system processing the image data can be reduced, and the efficiency of determination of the vehicle traveling trajectory can be improved.

Embodiment 3

Figure 3:
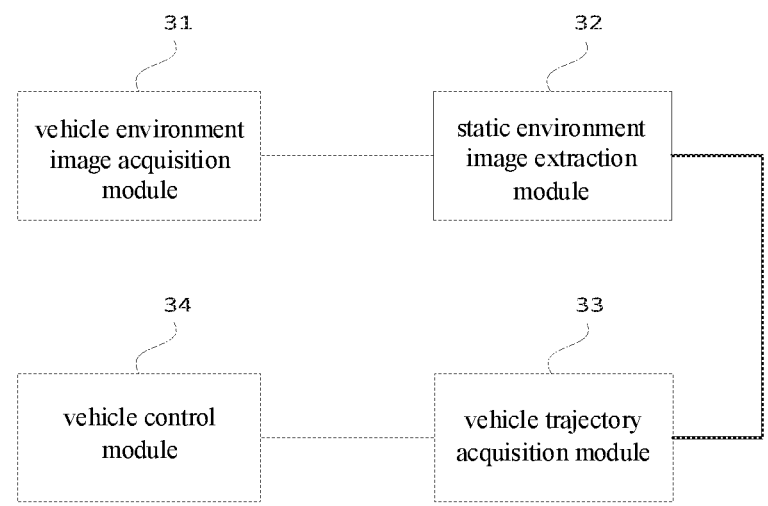
FIG. 3 is a block diagram of a device for controlling a vehicle according to Embodiment 3 of the present disclosure.

FIG. 3 is a block diagram of a device for controlling a vehicle according to Embodiment 3 of the present disclosure. The device can execute the method for controlling a vehicle according to any embodiment of the present disclosure, and has the functional modules for executing the method, and beneficial effects can be achieved. As illustrated in FIG. 3, the device may include a vehicle environment image acquisition module 31, a static environment image extraction module 32, a vehicle trajectory acquisition module 33, and a vehicle control module 34.

The vehicle environment image acquisition module 31 is configured to acquire a vehicle environment image by an image acquirer during traveling of the vehicle. The static environment image extraction module 32 is configured to extract a static environment image included in the vehicle environment image. The vehicle trajectory acquisition module 33 is configured to obtain a planned vehicle traveling trajectory by taking the static environment image as an input of a trajectory planning model. The vehicle control module 34 is configured to control the vehicle to travel according to the traveling trajectory of the vehicle.

On the basis of the above embodiments, the static environment image extraction module 32 may include a dynamic object recognition unit, and a dynamic object filtering unit. The dynamic object recognition unit is configured to recognize a dynamic object included in the vehicle environment image. The dynamic object filtering unit is configured to filter the dynamic object in the vehicle environment image to obtain the static environment image.

On the basis of the above embodiments, the static environment image extraction module 32 may further include a traveling environment determining unit, and a first image extracting unit. The traveling environment determining unit is configured to determine a traveling environment of the vehicle according to the vehicle environment image. The first image extracting unit is configured to extract a road surface image in the vehicle environment image when the traveling environment is an outdoor traveling environment.

On the basis of the above embodiments, the static environment image extraction module may further include a second image extracting unit. The second image extracting unit is configured to extract the road surface image and a ceiling image in the vehicle environment image when the traveling environment is an indoor traveling environment.

On the basis of the above embodiments, the trajectory planning model may be obtained by training historical static environment images and historical vehicle traveling trajectories based on a neural network model.

The device for controlling a vehicle according to the embodiment of the present disclosure may be configured to execute the method for controlling a vehicle according to any embodiment of the present disclosure, and has the functional modules for executing the method, and beneficial effect may be achieved, for details that are not described in the embodiment, reference may be made to the method for controlling a vehicle according to any embodiment of the present disclosure.

Embodiment 4

Figure 4:
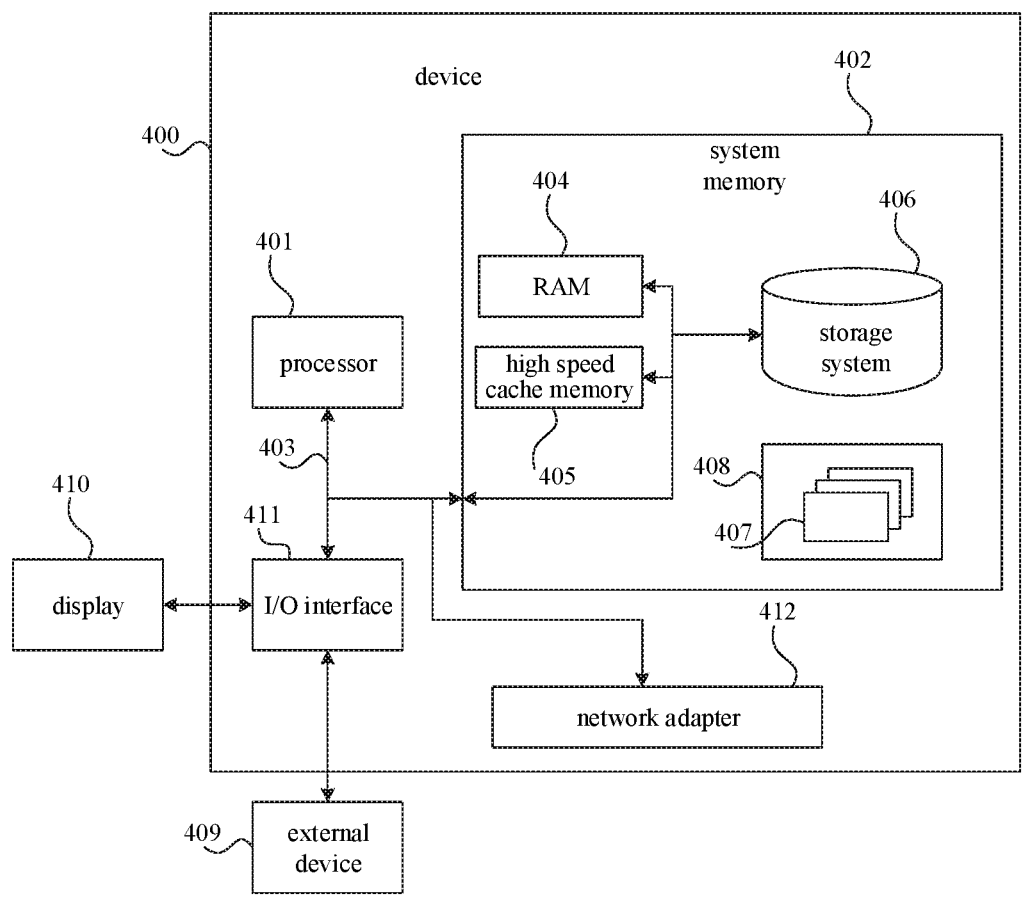
FIG. 4 is a schematic diagram of a device according to Embodiment 4 of the present disclosure.

FIG. 4 is a schematic diagram of a device according to Embodiment 4 of the present disclosure. FIG. 4 illustrates an exemplary device 400 suitable for implementing embodiments of the present disclosure. The device 400 shown in FIG. 4 is merely an example, and should not be considered as any restriction on the function and the usage range of embodiments of the present disclosure.

As shown in FIG. 4, the device 400 is in the form of a general-purpose computing device. The components of the device 400 may include, but are not limited to, one or more processors or processing units 401, a system memory 402, and a bus 403 that connects different system components (including the system memory 402 and the processing units 401).

The bus 403 represents one or more of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The device 400 typically includes a variety of computer system readable media. These media may be any available media accessible by the device 400, including both volatile and non-volatile media, removable and non-removable media.

The system memory 402 may include a computer system readable medium in the form of volatile memory, such as a random-access memory (hereinafter referred to as RAM) 404 and/or a high-speed cache memory 405. The device 400 may further include other removable or non-removable, volatile or non-volatile computer system storage medium. By way of example only, the storage system 406 may be configured to read and write non-removable and non-volatile magnetic media (not shown in FIG. 4, commonly referred to as a "hard drive"). Although not shown in FIG. 4, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), a digital video disc read only memory (hereinafter referred to as DVD-ROM) or other optical media may be provided. In these cases, each driver may be connected to the bus 403 via one or more data medium interfaces. The memory 402 may include at least one program product. The program product has a set of (such as, at least one) program modules configured to perform the functions of various embodiments of the present disclosure.

The programs/utilities 408 having a set of (at least one) program modules 407 may be stored, for example, the memory 402. The program modules 407 may include, but is not limited to, an operating system, one or more application programs, other programs modules and program data. Each of these examples, or some combination thereof, may include an implementation of a network environment. The program module 407 is generally configured to perform functions and/or methods in embodiments of the present disclosure.

The device 400 may also be in communication with one or more external devices 409 (e.g., a keyboard, a pointing device, a display 410, etc.). Furthermore, the device 400 may also communicate with one or more devices enabling a user to interact with the device 400 and/or other devices (e.g., a network card, a modem) that enables the device 400 to communicate with one or more other computing devices. This communication can be performed via the input/output (I/O) interface 411. Moreover, the device 400 can also communicate with one or more networks (such as a local area network (hereafter referred to as LAN), a wide area network (hereafter referred to as WAN) and/or a public network such as the Internet) through a network adapter 412. As shown in FIG. 4, the network adapter 412 communicates with other modules of the device 400 via the bus 403. It should be understood that although not shown in the figures, other hardware and/or software modules may be utilized in combination with the device 400, which include, but are not limited to, microcode, device drivers, redundant processing units, external disk drive arrays, RAID systems, tape drives, as well as data backup storage systems and the like.

The processing unit 401 is configured to execute various functional applications and data processing by running programs stored in the system memory 402, for example, to implement the method for controlling a vehicle according to embodiments of the present disclosure. The method includes: acquiring an image of an ambient environment of a vehicle by an image acquirer during traveling; extracting a static environment image included in the vehicle environment image of the vehicle; obtaining a planned vehicle traveling trajectory by taking the static environment image as an input of a trajectory planning model; and controlling the vehicle to travel according to the traveling trajectory of the vehicle.

Embodiment 5

Embodiments of the present disclosure also provide a computer readable storage medium that, when executed by a processor, the method for controlling a vehicle according to any embodiment of present disclosure may be implemented. The method includes: acquiring an image of an ambient environment of a vehicle by an image acquirer during traveling; extracting a static environment image included in the vehicle environment image of the vehicle; obtaining a planned vehicle traveling trajectory by taking the static environment image as an input of a trajectory planning model; and controlling the vehicle to travel according to the traveling trajectory of the vehicle.

The above non-transitory computer readable storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by or in connection with an instruction executed system, apparatus or device.

The computer readable signal medium may include a data signal propagating in baseband or as part of carrier wave which carries computer readable program codes. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, device or device, or a combination thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and technical principles applied thereto. Those skilled in the art should understand that, the present disclosure is not limited to the embodiments described herein, and various obvious changes, readjustments and substitutions will be within the scope of the present disclosure. Therefore, although the present disclosure has been described in detail by the above embodiments, the present disclosure is not limited to the above embodiments, and other equivalent embodiments may be included without departing from the concept of the present disclosure, and the scope of the present disclosure is determined by the scope of the appended claims.

What is claimed is:

1. A method for controlling a vehicle, comprising:
acquiring a vehicle environment image of the vehicle by an image acquirer during traveling of the vehicle;
extracting a static environment image comprised in the vehicle environment image;
obtaining a planned vehicle traveling trajectory by taking the static environment image as an input of a trajectory planning model, wherein the trajectory planning model is obtained by training a neural network model with taking a historical static environment image as an input of the neural network model, and taking a historical vehicle traveling trajectory associated with the historical static environment image as an output of the neural network model; and
controlling the vehicle to travel according to the planned vehicle traveling trajectory.

2. The method according to claim 1, wherein extracting the static environment image comprised in the vehicle environment image comprises:
recognizing a dynamic object comprised in the vehicle environment image; and
filtering the dynamic object in the vehicle environment image to obtain the static environment image.

3. The method according to claim 1, wherein extracting the static environment image comprised in the vehicle environment image comprises:
determining a traveling environment of the vehicle according to the vehicle environment image; and
when the traveling environment is an outdoor traveling environment, extracting a road surface image in the vehicle environment image.

4. The method according to claim 3, wherein after determining the traveling environment of the vehicle according to the vehicle environment image, the method further comprises:
when the traveling environment is an indoor traveling environment, extracting the road surface image and a ceiling image in the vehicle environment image.

5. A device for controlling a vehicle, comprising:
one or more processors;
a storage device, configured to store one or more programs;
wherein when the one or more programs are executed by the one or more processors, the one or more processors are caused to:
acquire a vehicle environment image by an image acquirer during traveling of the vehicle;
extract a static environment image comprised in the vehicle environment image;
obtain a planned vehicle traveling trajectory by taking the static environment image as an input of a trajectory planning model, wherein the trajectory planning model is obtained by training a neural network model with taking a historical static environment image as an input of the neural network model, and taking a historical vehicle traveling trajectory associated with the historical static environment image as an output of the neural network model; and
control the vehicle to travel according to the planned vehicle traveling trajectory.

6. The device according to claim 5, wherein the one or more processors are configured to:
recognize a dynamic object comprised in the vehicle environment image; and
filter the dynamic object in the vehicle environment image to obtain the static environment image.

7. The device according to claim 5, wherein the one or more processors are configured to:
determine a traveling environment of the vehicle according to the vehicle environment image; and
extract a road surface image in the vehicle environment image when the traveling environment is an outdoor traveling environment.

8. The device according to claim 7, wherein the one or more processors are configured to:
extract the road surface image and a ceiling image in the vehicle environment image when the traveling environment is an indoor traveling environment.

9. A non-transitory computer readable storage medium having stored thereon a computer program that, when executed by a processor, causes a method for controlling a vehicle to be implemented, the method comprising:
acquiring a vehicle environment image of the vehicle by an image acquirer during traveling of the vehicle;
extracting a static environment image comprised in the vehicle environment image;
obtaining a planned vehicle traveling trajectory by taking the static environment image as an input of a trajectory planning model, wherein the trajectory planning model is obtained by training a neural network model with taking a historical static environment image as an input of the neural network model, and taking a historical vehicle traveling trajectory associated with the historical static environment image as an output of the neural network model; and
controlling the vehicle to travel according to the planned vehicle traveling trajectory.

10. The non-transitory computer readable storage medium according to claim 9, wherein extracting the static environment image comprised in the vehicle environment image comprises:
recognizing a dynamic object comprised in the vehicle environment image; and
filtering the dynamic object in the vehicle environment image to obtain the static environment image.

11. The non-transitory computer readable storage medium according to claim 9, wherein extracting the static environment image comprised in the vehicle environment image comprises:
determining a traveling environment of the vehicle according to the vehicle environment image; and
when the traveling environment is an outdoor traveling environment, extracting a road surface image in the vehicle environment image.

12. The non-transitory computer readable storage medium according to claim 11, wherein after determining the traveling environment of the vehicle according to the vehicle environment image, the method further comprises:
when the traveling environment is an indoor traveling environment, extracting the road surface image and a ceiling image in the vehicle environment image.

* * * * *